(12) United States Patent
Li

(10) Patent No.: US 12,105,556 B2
(45) Date of Patent: Oct. 1, 2024

(54) TERMINAL DEVICE

(71) Applicant: VIVO MOBILE COMMUNICATION CO., LTD., Guangdong (CN)

(72) Inventor: Yaohui Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 462 days.

(21) Appl. No.: 17/355,748

(22) Filed: Jun. 23, 2021

(65) Prior Publication Data

US 2021/0318721 A1 Oct. 14, 2021

Related U.S. Application Data

(63) Continuation-in-part of application No. PCT/CN2019/128527, filed on Dec. 26, 2019.

(30) Foreign Application Priority Data

Dec. 29, 2018 (CN) .......................... 201811635759.1

(51) Int. Cl.
    *G06F 1/16* (2006.01)
(52) U.S. Cl.
    CPC .......... *G06F 1/1616* (2013.01); *G06F 1/1656* (2013.01)
(58) Field of Classification Search
    CPC .... G06F 1/1616; G06F 1/1656; G06F 1/1679; H04M 1/0214
    See application file for complete search history.

(56) References Cited

U.S. PATENT DOCUMENTS

| 6,433,777 B1 * | 8/2002 | Sawyer | G06F 1/1616 |
| | | | 361/679.13 |
| 2005/0023841 A1 * | 2/2005 | Chen | G06F 1/1679 |
| | | | 292/251.5 |

(Continued)

FOREIGN PATENT DOCUMENTS

| CN | 101571730 A | 11/2009 |
| CN | 203191898 U | 9/2013 |

(Continued)

OTHER PUBLICATIONS

Translation of CN-205193667-U (Year: 2016).*

(Continued)

*Primary Examiner* — Abhishek M Rathod
(74) *Attorney, Agent, or Firm* — Harness, Dickey & Pierce, P.L.C.

(57) ABSTRACT

A terminal device includes: a first folding portion; a second folding portion is connected to the first folding portion, and the first folding portion and the second folding portion are rotatable between a folded state in which the first folding portion and the second folding portion are folded and an unfolded state in which the first folding portion and the second folding portion are unfolded; a first magnetic component is disposed in the first folding portion; second magnetic components are disposed in the second folding portion; and an adjustment component is connected to the first magnetic component or the second magnetic components, and the adjustment component adjusts the first magnetic component or the second magnetic components, so that the first magnetic component and the second magnetic components attract or repel each other in the folded state.

16 Claims, 4 Drawing Sheets

(56) References Cited

U.S. PATENT DOCUMENTS

| | | | | |
|---|---|---|---|---|
| 2007/0133156 | A1* | 6/2007 | Ligtenberg | G06F 1/1616 |
| | | | | 361/679.3 |
| 2008/0048654 | A1* | 2/2008 | Takahashi | G01D 5/2448 |
| | | | | 324/207.25 |
| 2009/0073145 | A1* | 3/2009 | Inoue | H01H 36/006 |
| | | | | 345/184 |
| 2014/0306463 | A1* | 10/2014 | Ho | E05C 19/16 |
| | | | | 292/251.5 |
| 2018/0356864 | A1* | 12/2018 | Lee | E05D 1/00 |
| 2018/0364761 | A1 | 12/2018 | Lin et al. | |
| 2019/0004764 | A1* | 1/2019 | Son | G06F 1/1616 |

FOREIGN PATENT DOCUMENTS

| | | | | |
|---|---|---|---|---|
| CN | 204257473 | U | | 4/2015 |
| CN | 105491194 | A | | 4/2016 |
| CN | 205193667 | U | * | 4/2016 |
| CN | 107463203 | A | | 12/2017 |
| CN | 109803503 | A | | 5/2019 |
| JP | 2002204294 | A | | 7/2002 |

OTHER PUBLICATIONS

European Search report of EP3905863 (Year: 2022).*
Search report of EP3905863 (Year: 2022).*
Supplementary European Search Report regarding Patent Application No. 19904395.1-1216/3905863; PCT/CN2019/128527, dated Jan. 7, 2022.
International Search Report and Written Opinion of the International Searching Authority regarding International Patent Application No. PCT/CN2019/128527, dated Mar. 26, 2020. Translation provided by Bohui Intellectual Property.
First Office Action regarding Chinese Patent Application No. 201811635759.1, dated Jan. 17, 2020. Translation provided by Bohui Intellectual Property.
Second Office Action regarding Chinese Patent Application No. 201811635759.1, dated Jul. 3, 2020. Translation provided by Bohui Intellectual Property.
Third Office Action regarding Chinese Patent Application No. 201811635759.1, dated Nov. 12, 2020. Translation provided by Bohui Intellectual Property.

* cited by examiner

TERMINAL DEVICE

CROSS-REFERENCE TO RELATED APPLICATIONS

This application is a Bypass Continuation-in-Part Application of PCT/CN2019/128527 filed on Dec. 26, 2019, which claims priority to Chinese Patent Application No. 201811635759.1, filed on Dec. 29, 2018, which are incorporated herein by reference in their entirety.

TECHNICAL FIELD

The present disclosure relates to a terminal device.

BACKGROUND

A terminal device is developing towards a large screen. However, if the screen is larger, the size of the whole device is larger and the device is less portable. To accommodate the large screen and portability, a collapsible terminal device emerges.

SUMMARY

The present disclosure discloses a terminal device. The terminal device includes:
 a first folding portion;
 a second folding portion, where the second folding portion is connected to the first folding portion, and the first folding portion and the second folding portion are rotatable between a folded state in which the first folding portion and the second folding portion are folded and an unfolded state in which the first folding portion and the second folding portion are unfolded;
 a first magnetic component, where the first magnetic component is disposed in the first folding portion;
 second magnetic components, where the second magnetic components are disposed in the second folding portion; and
 an adjustment component, where the adjustment component is connected to the first magnetic component or the second magnetic components, and the adjustment component adjusts the first magnetic component or the second magnetic components, so that the first magnetic component and the second magnetic components attract or repel each other in the folded state.

BRIEF DESCRIPTION OF DRAWING

The accompanying drawings described herein are intended to provide a further understanding of the present disclosure, and constitute a portion of the present disclosure. The illustrative embodiments of the present disclosure and descriptions thereof are intended to describe the present disclosure, and do not constitute limitations on the present disclosure. In the accompanying drawings.

DESCRIPTION OF REFERENCE NUMERALS

Figure 1:
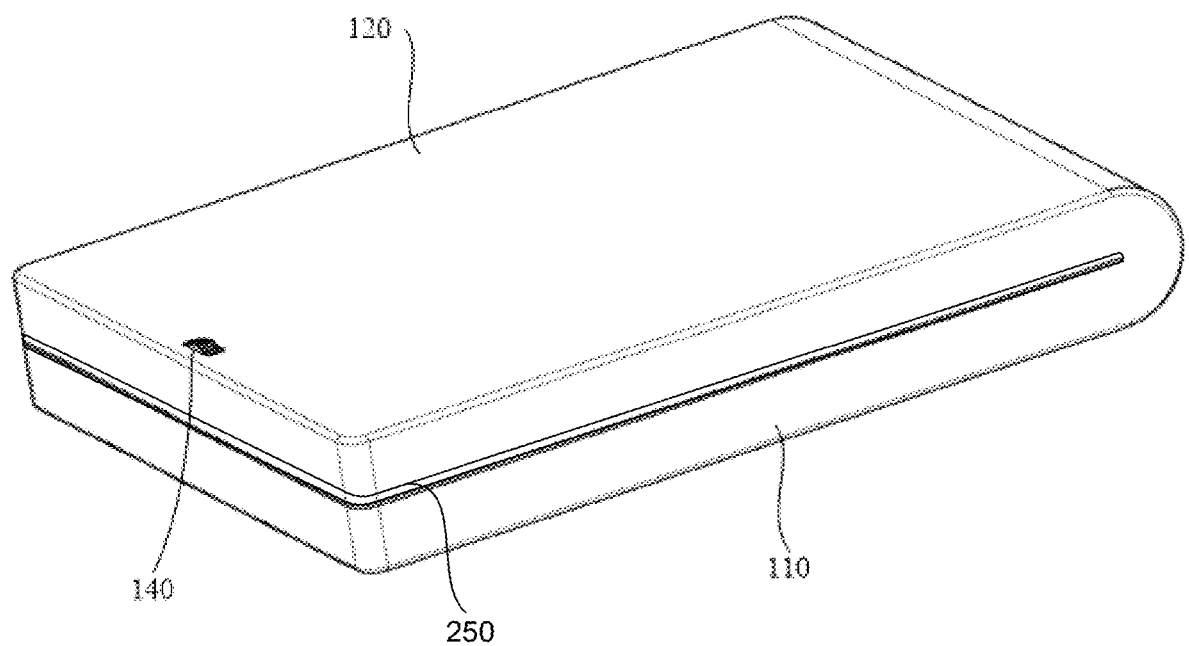
FIG. 1 is a schematic structural diagram of a terminal device according to some embodiments of the present disclosure.
Figure 2:
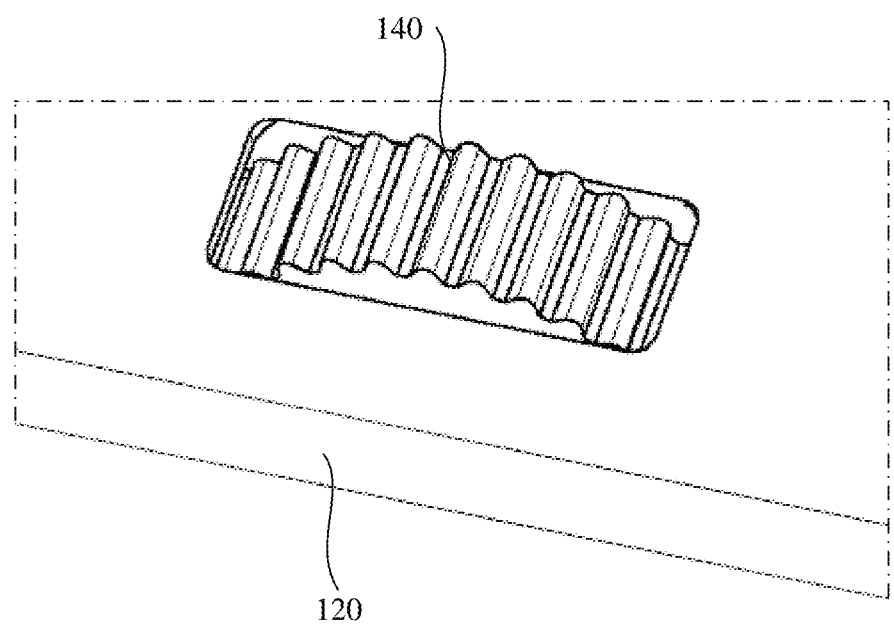
FIG. 2 is a partially enlarged view of the terminal device shown in FIG. 1.
Figure 3:
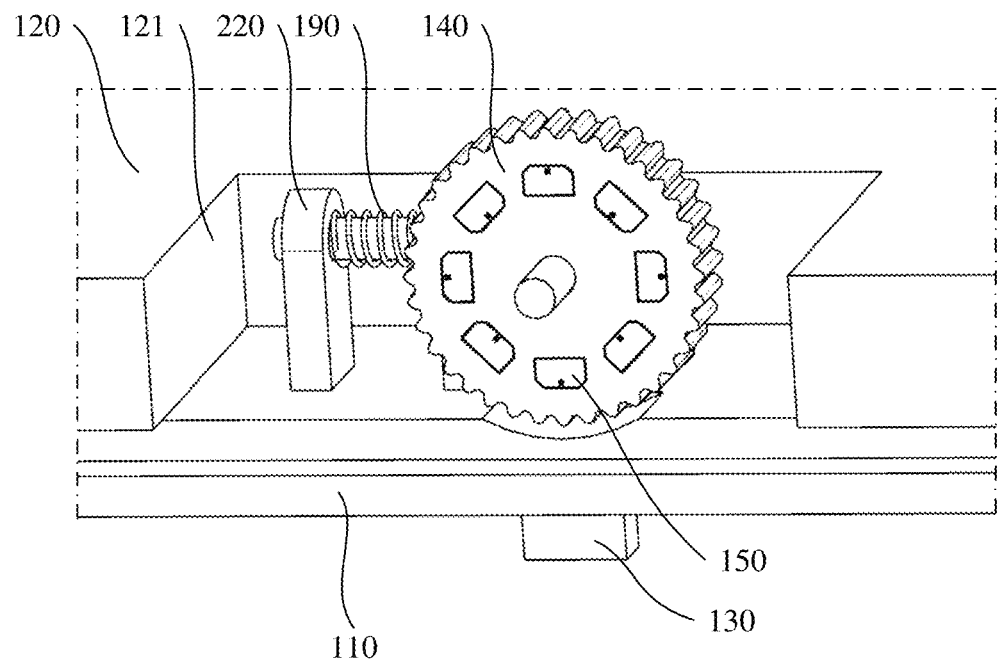
FIG. 3 is a schematic diagram of a partial structure of a terminal device according to some embodiments of the present disclosure.
Figure 4:
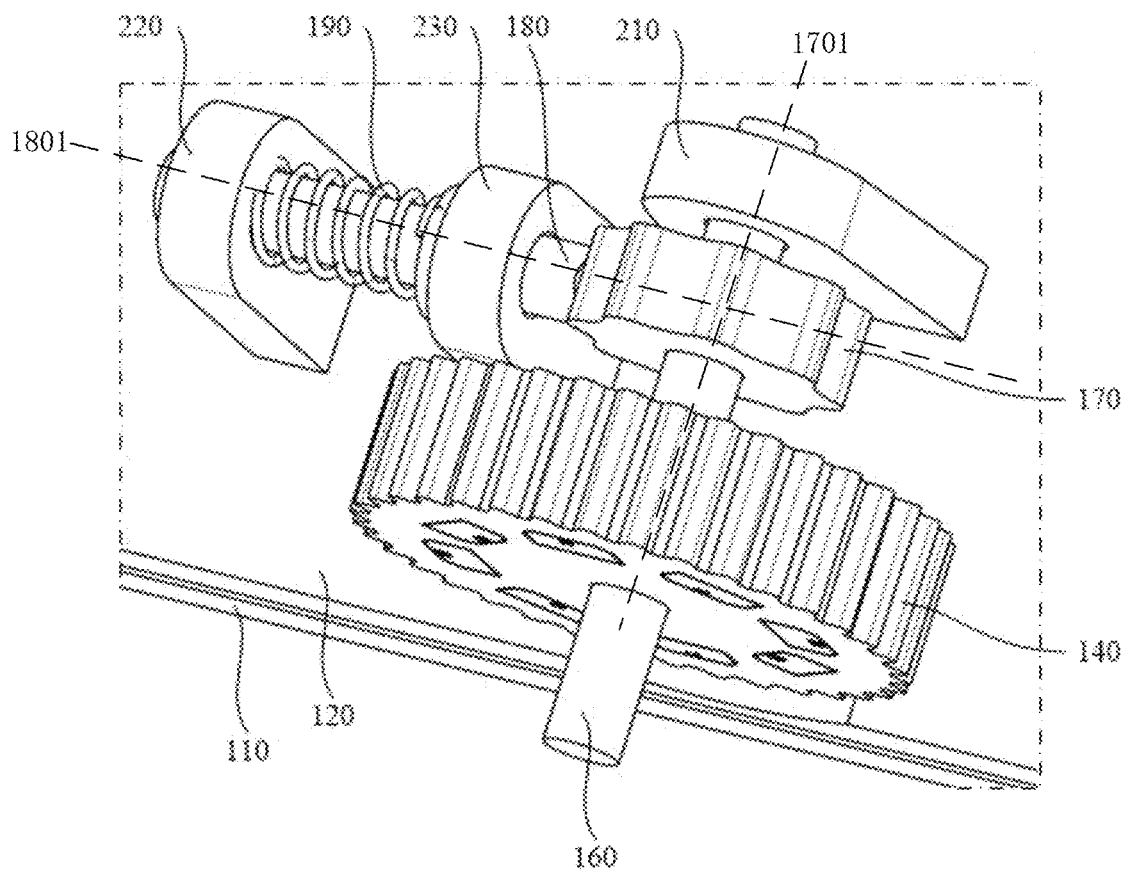
FIG. 4 and FIG. 5 are respectively schematic structural diagrams of the structure shown in FIG. 3 at different angles.
Figure 5:
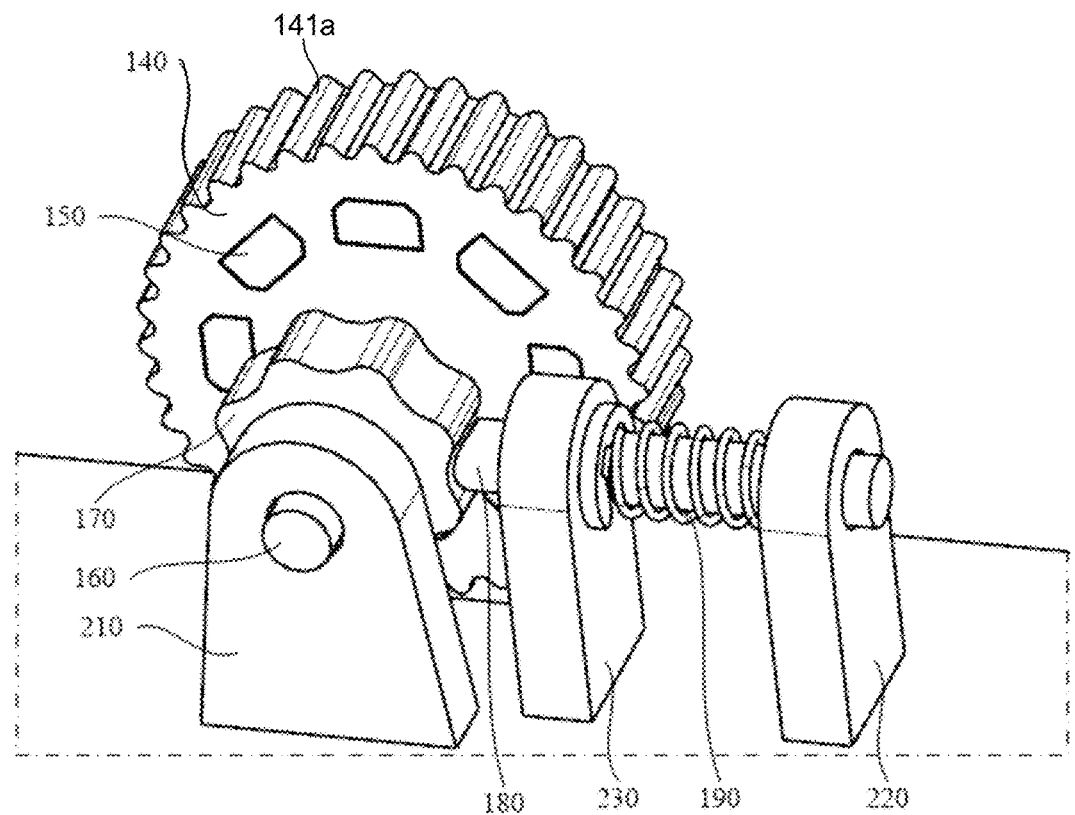
Figure 6:
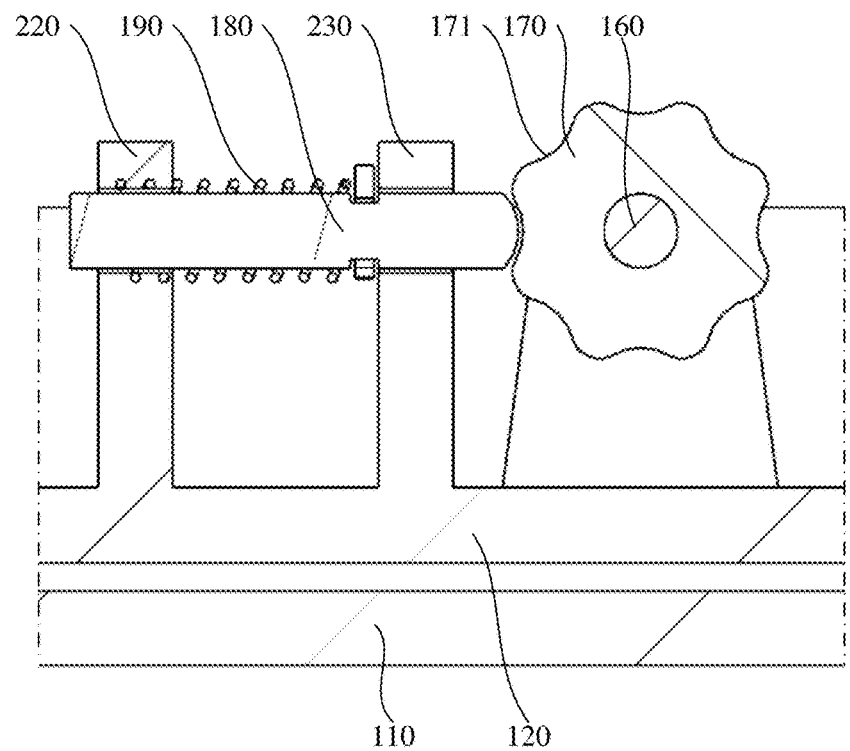
FIG. 6 is a sectional view of the structure shown in FIG. 3.

110—First folding portion; 111—Accommodating space; 120—Second folding portion; 121—Accommodating groove; 122—Groove; 130—First magnetic component, 140—Adjustment component; 141—Slip-proof portion; 150—Second magnetic components; 151—First part; 152—Second part; 160—Rotating shaft; 170—Positioning component; 171—Positioning groove; 180—Telescopic positioning rod; 190—Elastic component; 210—First support component; 220—Second support component; 230—Third support component; 240—Snap ring.

DESCRIPTION OF EMBODIMENTS

To make the objectives, technical solutions, and advantages of the present disclosure clearer, the following clearly describes the technical solutions in the present disclosure with reference to specific embodiments of the present disclosure and the corresponding accompanying drawings. Apparently, the described embodiments are some rather than all of the embodiments of the present disclosure. All other embodiments obtained by a person of ordinary skill in the art based on the embodiments of the present disclosure shall fall within the protection scope of the present disclosure.

When a user uses a collapsible terminal device, the user needs to open the terminal device in the following two operation manners:

In a first manner, one hand holds a portion of the terminal device, the other hand holds another portion of the terminal device, and then one hand exerts force or two hands exert forces simultaneously to open the terminal device. It can be learned that in this manner, both hands need to operate simultaneously. Once one hand of the user is occupied, the terminal device cannot be opened, and consequently the terminal device is not easy to use.

In a second manner, one hand holds a portion of the terminal device, and a thumb of the hand is inserted into a gap between two parts of the terminal device, to open the terminal device. However, this manner imposes a requirement on the gap between the two parts of the terminal device. If the gap is small, the finger cannot be inserted into the gap, and consequently the terminal device cannot be opened. Therefore, in this manner, the terminal device is not easy to use.

The technical solutions disclosed in the embodiments of the present disclosure are described in detail with reference to the accompanying drawings.

As shown in FIG. 1 to FIG. 8, some embodiments of the present disclosure disclose a terminal device, including a first folding portion 110, a second folding portion 120, a first magnetic component 130, an adjustment component 140, and second magnetic components 150. The first folding portion 110 is connected to the second folding portion 120, and the first folding portion 110 and the second folding portion 120 are rotatable between a folded state in which the first folding portion 110 and the second folding portion 120 are folded and an unfolded state in which the first folding portion 110 and the second folding portion 120 are unfolded. The first magnetic component 130 is disposed in the first folding portion 110, and has two parts with opposite magnetism. One of the two parts is closer to the second folding portion 120 than the other. The second magnetic components 150 are disposed in the second folding portion 120, and the adjustment component 140 is connected to the first magnetic component 130 or the second magnetic components 150. In a moving process of the adjustment component 140, the first magnetic component 130 or the second magnetic components 150 may be adjusted, so that the first magnetic component 130 and the second magnetic components 150 attract or repel each other in the folded state. When the first magnetic component 130 and the second magnetic components 150 attract each other, the first folding portion 110 and the second folding portion 120 may keep in the folded state. When the first magnetic component 130 and the second magnetic components 150 repel each other, the first folding portion 110 and the second folding portion 120 tend to move away from each other, and may be switched to the unfolded state. Both the first magnetic component 130 and the second magnetic components 150 may be magnets.

Figure 7:
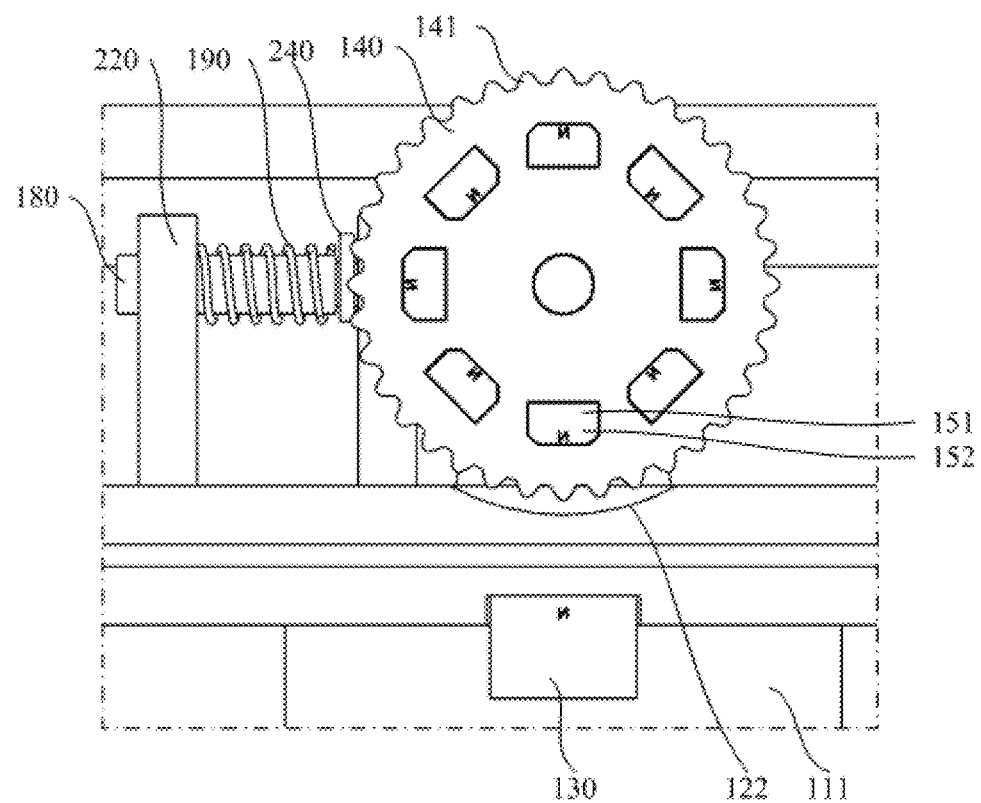
FIG. 7 is a schematic structural diagram of the structure shown in FIG. 3 in a first state.

As shown in FIG. 7, in the folded state, repulsive force is generated between the first magnetic component 130 and the second magnetic components 150. For example, in the folded state, the first magnetic component 130 and the second magnetic components 150 are arranged along a thickness direction of the terminal device. The first magnetic component 130 is relatively close to the second magnetic components 150, and magnetism of parts which are close to each other is the same. Therefore, the repulsive force is generated between the first magnetic component 130 and the second magnetic components 150. Under the action of the repulsive force, the first magnetic component 130 and the second magnetic components 150 are far away from each other, and then the first folding portion 110 and the second folding portion 120 are driven to be far away from each other, so as to open the terminal device.

Figure 8:
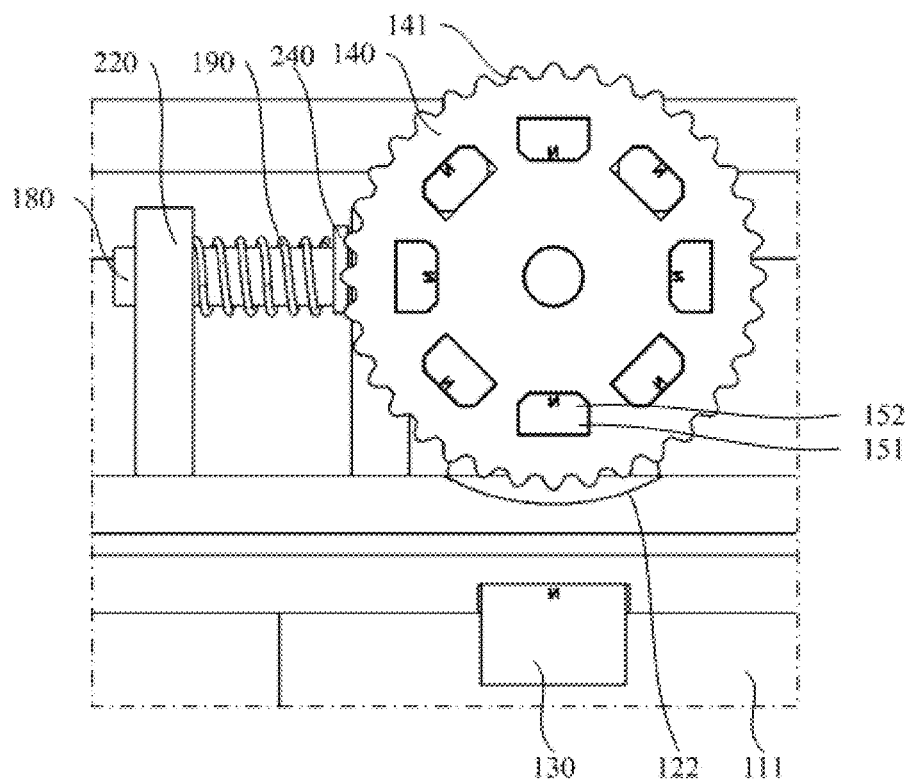
FIG. 8 is a schematic structural diagram of the structure shown in FIG. 3 in a second state.

As shown in FIG. 8, in the folded state, attractive force is generated between the first magnetic component 130 and the second magnetic components 150. For example, in the folded state, the first magnetic component 130 and the second magnetic components 150 are arranged along a thickness direction of the terminal device. The first magnetic component 130 is relatively close to the second magnetic components 150, and magnetism of parts which are close to each other is opposite. Therefore, the attractive force is generated between the first magnetic component 130 and the second magnetic components 150. In this case, the first folding portion 110 and the second folding portion 120 may be stacked reliably, and the first folding portion 110 and the second folding portion 120 are not easily separated even if the terminal device is acted by an external force in an accidental case.

After this solution is used, the user can move the adjustment component 140 through a single-hand operation, and a gap between the first folding portion 110 and the second folding portion 120 does not affect an opening operation of the terminal device. Therefore, the terminal device is more convenient to use.

Optionally, in this embodiment, the adjustment component 140 is disposed in the second folding portion 120, and the second magnetic components 150 are disposed in the adjustment component 140. The adjustment component 140 adjusts the second magnetic components 150, so that the first magnetic component 130 and the second magnetic components 150 attract or repel each other in the folded state. In this structure, a position of the second magnetic components 150 may be adjusted when the adjustment component 140 is forced to move, so that action force formed between the first magnetic component 130 and the second magnetic components 150 changes, and then the terminal device is opened or the first folding portion 110 and the second folding portion 120 keep in the folded state.

In an embodiment, the adjustment component 140 may be rotatably disposed in the second folding portion 120 by using a rotating shaft 160, and the rotating shaft 160 may extend along a direction parallel to a plane in which the second folding portion 120 is located. Because the second magnetic components 150 are disposed in the adjustment component 140, when the adjustment component 140 rotates relative to the second folding portion 120, a position of the second magnetic components 150 relative to the second folding portion 120 changes, so that action force formed between the first magnetic component and the second magnetic components 150 changes, and then the terminal device is opened or the first folding portion 110 and the second folding portion 120 keep in the folded state. Optionally, the adjustment component 140 may be a rotating wheel.

It should be noted that magnetic labeling (for example, "N" in FIG. 7 and FIG. 8) may be performed on the first magnetic component 130 and the second magnetic components 150, to facilitate assembly of the terminal device.

One second magnetic components 150 may be disposed, and two parts of the second magnetic components 150 whose magnetism is opposite may be arranged along a rotation direction of the adjustment component 140. Through forward rotation and reverse rotation of the adjustment component 140, action force formed between the first magnetic component 130 and the second magnetic components 150 may be adjusted. However, when this structure is used, to enable the adjustment component 140 to function more quickly, the user needs to distinguish the rotation direction of the adjustment component 140 based on different requirements, and user experience is still not ideal. Therefore, in some embodiments of the present disclosure, the second magnetic components 150 may include a first portion 151 and a second portion 152 with opposite magnetism, a plurality of second magnetic components 150 are disposed, the plurality of second magnetic components 150 are spaced apart, and the first portion 151 of one of two adjacent second magnetic components 150 is located between the second portion 152 and a rotating shaft 160 of the adjustment component 140, and the second portion 152 of the other of the two adjacent second magnetic components is located between the first portion 151 and the rotating shaft 160. In other words, magnetic pole arrangement directions of the two adjacent second magnetic components 150 are opposite. In this case, regardless of a direction in which the user rotates the adjustment component 140, the adjustment component 140 can quickly adjust action force formed between the first magnetic component 130 and the second magnetic component 150. Therefore, the user does not need to distinguish the rotation direction of the adjustment component 140.

In a process of rotating the adjustment component 140, a change in a distance between the second magnetic components 150 and the first magnetic component 130 affects stability of the action force. To better control a magnitude of the action force between the first magnetic component 130 and the second magnetic components 150, the plurality of second magnetic components 150 may be arranged along the rotation direction of the adjustment component 140. In this way, in the process of rotating the adjustment component 140, the distance between the second magnetic components 150 and the first magnetic component 130 changes slightly, and the action force between the second magnetic components 150 and the first magnetic component 130 is more stable.

In some embodiments, the terminal device may further include a positioning component 170 that rotates coaxially with the adjustment component 140 and a telescopic positioning rod 180 disposed in the second folding portion 120. The positioning component 170 may be a positioning wheel, and a positioning groove 171 is disposed on a side surface of the positioning component 170, and the telescopic positioning rod 180 is configured to perform positioning fitting with the positioning groove 171 along a rotation direction of the positioning component 170. It should be noted that the side surface herein is a surface extending along the rotation direction of the positioning component 170. Positioning of the adjustment component 140 can be implemented by positioning fitting between the positioning groove 171 and the telescopic positioning rod 180, so as to prevent a case in which the adjustment component 140 rotates freely after action force exerted by the user is removed, thereby improving reliability of the terminal device in a use process.

Optionally, the structure formed by the positioning component 170 and the telescopic positioning rod 180 has a reset function. That is, the structure formed by the positioning component 170 and the telescopic positioning rod 180 may be referred to as a reset component.

Optionally, only one positioning groove 171 may be disposed on the side surface of the positioning component 170, or a plurality of positioning grooves 171 may be disposed. When a plurality of positioning grooves 171 is disposed, the plurality of positioning grooves 171 may be arranged along the rotation direction of the positioning component 170. Therefore, reliable positioning of the adjustment component 140 can be implemented regardless of a rotation state of the adjustment component 140.

Expansion and contraction of the telescopic positioning rod 180 may be implemented in an electric manner. However, to simplify a structure of the terminal device, an elastic component 190 may be further disposed. One end of the elastic component 190 is disposed in the second folding portion 120, the other end of the elastic component 190 acts on the telescopic positioning rod 180, and action force that enables the telescopic positioning rod 180 to be close to the positioning groove 171 is exerted on the telescopic positioning rod 180. When the adjustment component 140 rotates, the positioning component 170 rotates synchronously. The positioning component 170 first exerts action force that enables the positioning component 170 to disengage from the positioning groove 171, so that the positioning component 170 no longer performs positioning fitting with the positioning groove 171, thereby ensuring that the adjustment component 140 can rotate smoothly. In this case, the elastic component 190 is deformed by force. After the adjustment component 140 rotates at a specified angle, action force exerted by the positioning component 170 on the telescopic positioning rod 180 becomes smaller, and action force exerted by the elastic component 190 on the telescopic positioning rod 180 becomes larger, so that the telescopic positioning rod 180 performs positioning fitting with the positioning groove 171 again, so that the adjustment component 140 keeps in a predetermined state.

In some embodiments, to facilitate mounting of the adjustment component 140, the positioning component 170, the telescopic positioning rod 180, and the elastic component 190, the terminal device disclosed in some embodiments of the present disclosure may further include a first support component 210, a second support component 220, and a third support component 230 that are disposed in the second folding portion 120. The rotating shaft 160 is mounted on the first support component 210, and can rotate relative to the first support component 210. Both the adjustment component 140 and the positioning component 170 are sleeved on the rotating shaft 160. The second support component 220 and the third support component 230 are spaced apart, and the telescopic positioning rod 180 is mounted on the second support component 220 and the third support component 230. The elastic component 190 may be disposed as a spring, and is sleeved outside the telescopic positioning rod 180. A snap ring 240 may be disposed on the telescopic positioning rod 180. One end of the elastic component 190 is fastened to the second support component 220, and action force is exerted on the telescopic positioning rod 180 by using the snap ring 240.

To prolong a service life of the terminal device, the positioning groove 171 has an arc-shaped inner wall, and an end of the telescopic positioning rod 180 has an arc-shaped positioning surface that is in contact with the arc-shaped inner wall. By using this structure, a contact area between the positioning component 170 and the telescopic positioning rod 180 can be increased, so as to alleviate wear caused when the positioning component 170 and the telescopic positioning rod 180 relatively move, thereby achieving the foregoing objective.

The telescopic positioning rod 180 has a centerline 1801 extending along an extension direction of the telescopic positioning rod 180. If the centerline 1801 does not intersect a rotation axis 1701 of the positioning component 170, a rotation moment is exerted on the positioning component 170, causing a rotation trend of the positioning component 170. Once the rotation trend is transferred to the adjustment component 140, a state of the first folding portion 110 and the second folding portion 120 is affected. Therefore, to resolve this hidden problem, the centerline 1801 of the telescopic positioning rod 180 may intersect the rotation axis 1701 of the positioning component 170, to prevent the telescopic positioning rod 180 from exerting the rotation moment on the positioning component 170.

To improve structural compactness and aestheticism of the terminal device, an accommodating groove 121 is disposed on one side of the second folding portion 120 that is opposite to the first folding portion 110, the adjustment component 140, the positioning component 170, and the telescopic positioning rod 180 are located in the accommodating groove 121, and a portion of the adjustment component 140 is exposed to the accommodating groove 121. The portion of the adjustment component 140 that is exposed to the accommodating groove 121 may be operated by the user, and the remaining part, the positioning component 170, and the telescopic positioning rod 180 may be shielded, to ensure aestheticism. In addition, a notching manner may reduce space occupied by the adjustment component 140, the positioning component 170, and the telescopic positioning rod 180, so that structural compactness of the terminal device is improved.

Optionally, a groove 122 may be disposed on a bottom surface of the accommodating groove 121, and the groove 122 and the first magnetic component 130 are arranged along a thickness direction of the terminal device. After the groove 122 is disposed, the adjustment component 140 may be closer to the first magnetic component 130, so that a distance between the first magnetic component 130 and the second magnetic components 150 is smaller, and repulsive force or attractive force formed between the first magnetic component 130 and the second magnetic components 150 increases, thereby more reliably implementing opening and closing of the terminal device. For example, the groove 122 may be an arc-shaped groove.

In an optional embodiment, the terminal device may further include a reset component (not shown in the figure). The reset component is disposed in the second folding portion 120, and is configured to exert rotational reset force on the adjustment component 140. The adjustment component 140 is reset under the action of the rotational reset force. For example, after the adjustment component 140 is reset, the first magnetic component 130 and the second magnetic components 150 attract each other. In other words, a state in which the first magnetic component 130 and the second magnetic components 150 attract each other may be used as an initial state of the adjustment component 140. When the user operates the adjustment component 140, elastic force of the reset component can be overcome, so that the adjustment component 140 is driven to rotate. After action force exerted by the user is withdrawn, the adjustment component 140 is reset under the action of the reset component. In this case, the first magnetic component 130 and the second magnetic components 150 attract each other instead of repelling, and the terminal device can reliably keep in the folded state. Therefore, when the user needs to fold the terminal device, the first folding portion 110 and the second folding portion 120 are directly driven to be relatively close to each other, and the adjustment component 140 does not need to be operated again. It can be learned that this structure can further simplify an operation of the terminal device.

Certainly, in addition to being rotatably disposed in the second folding portion 120, the adjustment component 140 may be movably disposed in the second folding portion 120. When the user exerts action force on the adjustment component 140 to move the adjustment component 140 relative to the second folding portion 120, the position of the second magnetic components 150 changes, thereby adjusting the action force formed between the first magnetic component 130 and the second magnetic components 150.

Optionally, if the foregoing movable disposing solution is used, when a plurality of second magnetic components 150 are disposed, and the second magnetic components 150 include the first portion 151 and the second portion 152 with opposite magnetism, and the first portion 151 of one of two adjacent second magnetic components 150 is located between the second portion 152 and the first folding portion 110, and the second portion 152 of the other of the two adjacent second magnetic components is located between the first portion 151 and the first folding portion 110. Referring to the foregoing description, when this disposing manner is used, the user can quickly adjust the action force formed between the first magnetic component 130 and the second magnetic components 150 without distinguishing a moving direction of the adjustment component 140.

Optionally, the plurality of second magnetic components 150 may be arranged along the moving direction of the adjustment component 140, so that the action force between the second magnetic components 150 and the first magnetic component 130 is more stable.

Similarly to the foregoing accommodating groove 121, to improve structural compactness and aestheticism of the terminal device, an accommodating space 111 is disposed on one side of the first folding portion 110 that is opposite to the second folding portion 120, and the first magnetic component 130 is located in the accommodating space 111.

A slip-proof portion 141 may be disposed on a side surface of the adjustment component 140, so that the user can exert action force on the adjustment component 140 more easily. The slip-proof portion 141 herein may be a structure such as a mesh groove or a slip-proof protrusion 141a. This is not limited in this specification. To simplify a structure of the adjustment component 140 and facilitate processing of the adjustment component 140, in some embodiments of the present disclosure, the slip-proof portion 141 may include a plurality of slip-proof protrusions 141a spaced apart. Optionally, the plurality of slip-proof protrusion 141a may form a toothed structure. It should be noted that the side surface herein is a surface extending along the rotation direction of the adjustment component 140.

The terminal device disclosed in some embodiments of the present disclosure may be a smartphone, a tablet computer, an e-book reader, or a wearable device. Certainly, the terminal device may be another device. This is not limited in some embodiments of the present disclosure. In an optional embodiment, a display panel 250 is disposed on at least one of the first folding portion 110 and the second folding portion 120. Optionally, a display panel 250 is disposed in each of the first folding portion 110 and the second folding portion 120. When the terminal device is in a folded state, display panels 250 of the first folding portion 110 and the second folding portion 120 may be opposite to each other. When the terminal device is opened, the two display panels 250 are concatenated into an entire display screen or form a double-sided screen. Alternatively, when the terminal device is in a folded state, display panels 250 of the first folding portion 110 and the second folding portion 120 face up or down.

The foregoing embodiments of the present disclosure focus on describing differences between the embodiments, and different optimization features of the embodiments may be combined to form better embodiments provided that they are not contradictory. For brevity, details are not described herein again.

The foregoing descriptions are merely embodiments of this disclosure, but are not intended to limit this disclosure. For a person skilled in the art, the present disclosure may have various changes and variations. Any modification, equivalent replacement, or improvement made without departing from the spirit and principle of this disclosure shall fall within the scope of claims of this disclosure.

What is claimed is:

1. A terminal device, comprising:
   a first folding portion;
   a second folding portion, wherein the second folding portion is connected to the first folding portion, and the first folding portion and the second folding portion are rotatable between a folded state in which the first folding portion and the second folding portion are folded and an unfolded state in which the first folding portion and the second folding portion are unfolded;
   a first magnetic component, wherein the first magnetic component is disposed in the first folding portion;
   second magnetic components, wherein the second magnetic components are disposed in the second folding portion; and
   an adjustment component, wherein the adjustment component is connected to the first magnetic component or the second magnetic components, and the adjustment component adjusts the second magnetic components, so that the first magnetic component and the second magnetic components attract or repel each other in the folded state;

wherein the adjustment component is rotatable relative to the second folding portion and rotatably disposed in the second folding portion;

wherein the second magnetic components are disposed in the adjustment component;

wherein the terminal device further comprises a positioning component that rotates coaxially with the adjustment component and a telescopic positioning rod disposed in the second folding portion; and wherein a positioning groove is disposed on a side surface of the positioning component, and the telescopic positioning rod performs positioning fitting with the positioning groove along a rotation direction of the positioning component.

2. The terminal device according to claim 1, wherein the second magnetic components comprise a first portion and a second portion with opposite magnetism, a plurality of second magnetic components are disposed, the plurality of second magnetic components are spaced apart, a first portion of one of two adjacent second magnetic components is located between a second portion and a rotating shaft of the adjustment component and a second portion of the other of the two adjacent second magnetic components is located between the first portion and the rotating shaft.

3. The terminal device according to claim 2, wherein the plurality of second magnetic components are arranged along a rotation direction of the adjustment component.

4. The terminal device according to claim 1, wherein a plurality of positioning grooves are disposed on the side surface of the positioning component, and the plurality of positioning grooves are arranged along the rotation direction of the positioning component.

5. The terminal device according to claim 1, further comprising an elastic component, wherein one end of the elastic component is disposed in the second folding portion, the other end of the elastic component acts on the telescopic positioning rod, and action force that enables the telescopic positioning rod to be close to the positioning groove is exerted on the telescopic positioning rod.

6. The terminal device according to claim 1, wherein the positioning groove has an arc-shaped inner wall, and an end of the telescopic positioning rod has an arc-shaped positioning surface that is in contact with the arc-shaped inner wall.

7. The terminal device according to claim 1, wherein the telescopic positioning rod has a centerline extending along an extension direction of the telescopic positioning rod, and the centerline intersects a rotation axis of the positioning component.

8. The terminal device according to claim 1, wherein an accommodating groove is disposed on one side of the second folding portion that is opposite to the first folding portion, the adjustment component, the positioning component, and the telescopic positioning rod are located in the accommodating groove, and a portion of the adjustment component is exposed to the accommodating groove.

9. The terminal device according to claim 8, wherein a groove is disposed on a bottom surface of the accommodating groove, and the groove and the first magnetic component are arranged along a thickness direction of the terminal device.

10. The terminal device according to claim 1, further comprising a reset component, wherein the reset component is disposed in the second folding portion, rotational reset force is exerted on the adjustment component, and the adjustment component is reset under the action of the rotational reset force.

11. The terminal device according to claim 1, wherein the adjustment component is movably disposed in the second folding portion.

12. The terminal device according to claim 11, wherein the second magnetic components comprise a first portion and a second portion with opposite magnetism, a plurality of second magnetic components are disposed, the plurality of second magnetic components are spaced apart, and the first portion of one of two adjacent second magnetic components is located between the second portion and the first folding portion and the second portion of the other of the two adjacent second magnetic components is located between the first portion and the first folding portion.

13. The terminal device according to claim 1, wherein an accommodating space is disposed on one side of the first folding portion that is opposite to the second folding portion, and the first magnetic component is located in the accommodating space.

14. The terminal device according to claim 1, wherein a slip-proof portion is disposed on a side surface of the adjustment component.

15. The terminal device according to claim 14, wherein the slip-proof portion comprises a plurality of slip-proof protrusions spaced apart.

16. The terminal device according to claim 1, wherein a display panel is disposed on at least one of the first folding portion and the second folding portion.

* * * * *